(12) United States Patent
Schmuck et al.

(10) Patent No.: US 7,850,212 B2
(45) Date of Patent: Dec. 14, 2010

(54) SEGMENTED LOCKING RING AND CORRESPONDING ASSEMBLY AND MOUNTING METHOD

(75) Inventors: Jean-François Schmuck, Tonnoy (FR); Michel Forfert, Delme (FR); Alain Percebois, Blenod les Pont-A-Mousson (FR); Pierre Genelot, Norroy (FR)

(73) Assignee: Saint-Gobain Pam, Nancy (FR)

( * ) Notice: Subject to any disclaimer, the term of this patent is extended or adjusted under 35 U.S.C. 154(b) by 400 days.

(21) Appl. No.: 11/577,550

(22) PCT Filed: Oct. 11, 2005

(86) PCT No.: PCT/FR2005/002518

§ 371 (c)(1),
(2), (4) Date: Apr. 19, 2007

(87) PCT Pub. No.: WO2006/045915

PCT Pub. Date: May 4, 2006

(65) Prior Publication Data

US 2008/0007057 A1    Jan. 10, 2008

(30) Foreign Application Priority Data

Oct. 22, 2004    (FR) .................................. 04 11304

(51) Int. Cl.
*F16L 21/02*    (2006.01)

(52) U.S. Cl. ........................ 285/374; 285/237; 285/309; 285/332; 285/339; 285/342

(58) Field of Classification Search .................... 285/23, 285/230–232, 237, 309–310, 332, 339, 342–343, 285/374, 305
See application file for complete search history.

(56) References Cited

U.S. PATENT DOCUMENTS

| | | | | |
|---|---|---|---|---|
| 1,884,063 A | * | 10/1932 | McWane | 285/295.3 |
| 1,884,064 A | * | 10/1932 | McWane | 285/295.3 |
| 2,586,950 A | * | 2/1952 | Hynes | 285/341 |
| 2,922,665 A | * | 1/1960 | Beyer | 285/105 |
| 3,313,669 A | * | 4/1967 | Say | 156/294 |
| 3,398,977 A | | 8/1968 | Yoneda | |
| 4,126,337 A | * | 11/1978 | Nagao et al. | 285/231 |
| 4,203,190 A | * | 5/1980 | Temple et al. | 29/451 |
| 4,428,604 A | * | 1/1984 | Conner | 285/321 |
| 4,456,288 A | * | 6/1984 | Conner | 285/321 |

(Continued)

FOREIGN PATENT DOCUMENTS

EP    1 013 980 A2    6/2000

(Continued)

*Primary Examiner*—Aaron Dunwoody
*Assistant Examiner*—Fannie Kee
(74) *Attorney, Agent, or Firm*—Sughrue Mion, PLLC

(57) ABSTRACT

This locking ring is adapted to lock a joint between two tubular elements (4, 8). It extends around a central axis (X-X) and comprises segments (50) each having a main part (58) and two circumferential ends (60). Each segment (50) has a shape flaring out from a thin axial side towards a wide axial side. One of the segments (50) comprises a recess (62) for receiving a retaining member (16), which is axially open on the thin side. The receiving recess (62) extends solely through the main part, and it is circumferentially limited on both sides.

12 Claims, 8 Drawing Sheets

U.S. PATENT DOCUMENTS 4,524,505 A * 6/1985 Conner .................. 29/453
4,685,708 A 8/1987 Conner et al.
6,062,611 A * 5/2000 Percebois et al. ........... 285/374
6,179,347 B1 * 1/2001 Dole et al. ............... 285/321
6,533,331 B2 * 3/2003 Hulsebos et al. ........... 285/323

FOREIGN PATENT DOCUMENTS

WO    WO 97/03314 A1    1/1997

* cited by examiner

SEGMENTED LOCKING RING AND CORRESPONDING ASSEMBLY AND MOUNTING METHOD

BACKGROUND OF THE INVENTION

The present invention relates to a locking ring adapted to lock a joint between two tubular elements, of the type which extends around a central axis and comprises at least two rigid segments which each have a main part and two circumferential ends, each segment having a shape which flares out from a thin axial side to a thick axial side.

It is particularly applicable to the locked assembly of cast iron pipes having a nominal diameter in excess of 500 millimeters.

U.S. Pat. No. 4,685,708 discloses a locking ring of this type. This ring is held on a bell end by means of a fastener which is inserted between the ends of two adjacent segments. The manipulation of this ring is complicated and the assembly is therefore expensive.

Another type of locking ring is known from EP-A-690-257. This document describes a split locking ring which is provided, in its part facing the entrance of the bell end, with a stepped recess around the whole of the ring.

To facilitate assembly, this document proposes a retaining ring which extends into the stepped recess before and during the fitting of the spigot end.

The locking ring according to this document has only one segment and is not adapted for joining large-diameter pipes.

SUMMARY OF THE INVENTION

The object of the invention is to overcome the aforementioned drawbacks, and to propose a locking ring which permits simple manipulation, facilitates the insertion of the spigot end into the bell end, and, ultimately, provides efficient locking of the joint between the spigot end and the bell end, particularly when the pipes are of large diameter.

For this purpose, the invention proposes a locking ring of the aforementioned type, characterized in that at least one of the segments comprises at least one recess for receiving a retaining member, in that the receiving recess is axially open on the thin side, in that the receiving recess extends solely through the main part, and in that the receiving recess is circumferentially limited on both sides.

In specific embodiments of the invention, the locking ring has one or more of the following features:
the receiving recess is radially open towards the interior of the central axis;
the receiving recess extends through the whole axial length of the segment in such a way that it is axially open on both sides;
the receiving recess is circumferentially centred with respect to the two ends of the segment, particularly when this segment has only one single receiving recess;
the ring comprises resilient connecting elements, each connecting the two ends of two adjacent segments;
each segment which is connected to another segment by a connecting element comprises housings for the connecting elements, these housings being open circumferentially and radially towards the inside;
the ring comprises, on the thin side, a radially internal chamfer flaring axially towards the outside.

The invention also proposes a pipe assembly of the type comprising:
a bell end provided with a channel for housing a locking ring, and
a locking ring adapted to lock a spigot end in the bell end, characterized in that the locking ring is a ring as defined above, and in that the assembly comprises at least one member for retaining a segment on the bell end in opposition to a radially inward displacement, the retaining member being fastened to the bell end and extending into the receiving recess.

In specific embodiments, the pipe assembly has one or more of the following characteristics:
the retaining member comprises a branch extending into the receiving recess through the whole axial length of the recess; and
the assembly also comprises a spigot end inserted into the bell end, the spigot end being locked in the bell end by means of the locking ring.

Finally, the invention proposes a method of forming an assembly as described above, characterized by the following successive steps:
a) insertion of the locking ring into the channel of the bell end and pre-expansion of the ring by means of the retaining members;
b) fitting of the spigot end into the bell end and radial spreading of the locking ring during the passage of the spigot end;
c) withdrawal of the retaining member or members, causing the locking ring to be tightened again around the spigot end;
d) continuation of the fitting of the spigot end, when this end has a locking collar, until this collar passes through the locking ring; and
e) withdrawal of the spigot end until it reaches the locked position, in which the ring bears against a locking surface of the bell end.

BRIEF DESCRIPTION OF THE DRAWINGS

The invention will be more clearly understood with the aid of the following description, provided solely by way of example, which refers to the attached figures, in which.

DETAIL DESCRIPTION OF THE INVENTION

FIGS. 1 to 5 show a pipe assembly according to the invention, indicated by the general reference 2.

The pipe assembly 2 extends along a central axis X-X. In the following text, the terms "radially", "circumferentially" and "axially" are used with reference to this axis X-X.

Figure 2:
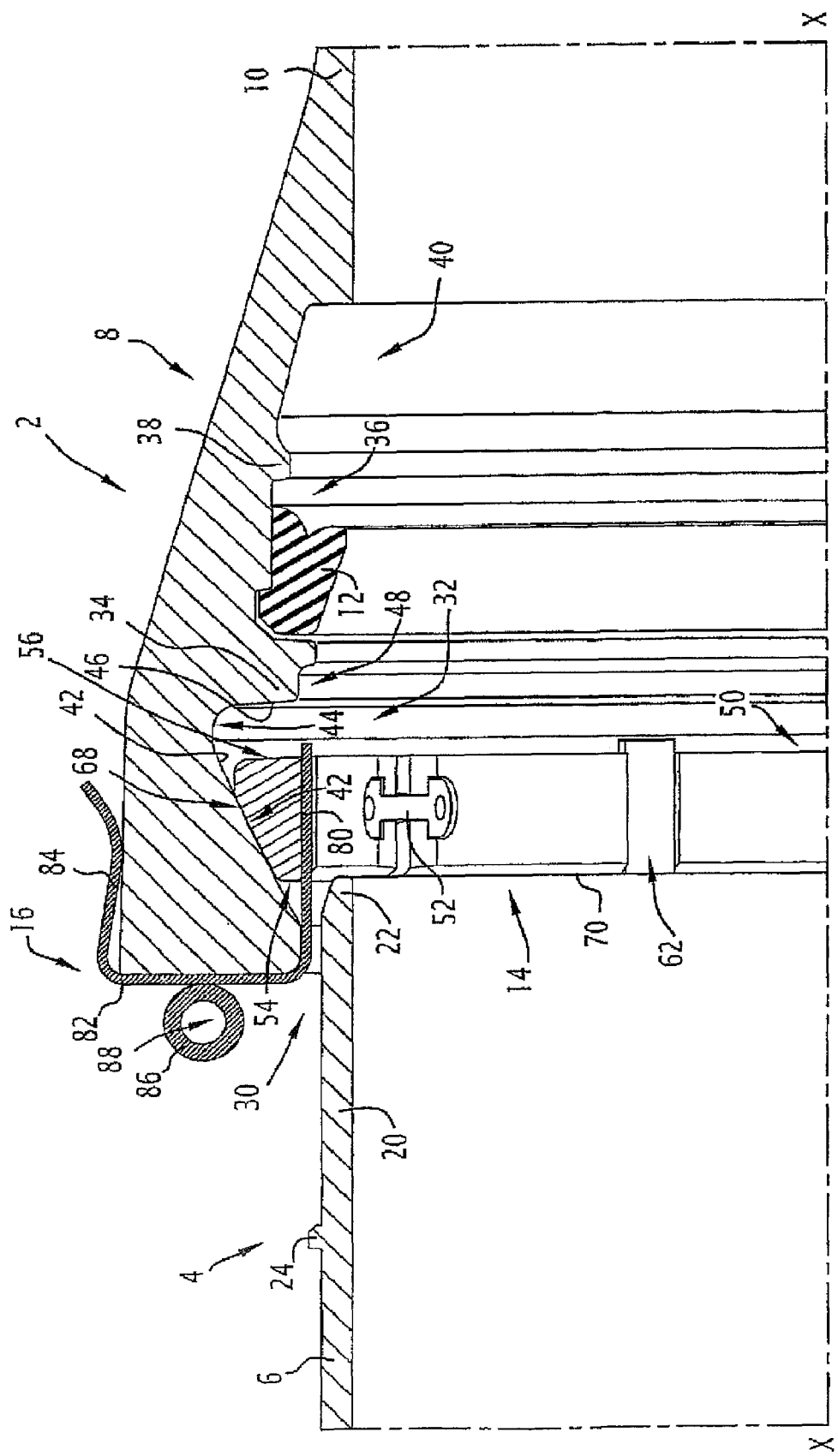

As shown in FIG. 2, the assembly 2 comprises a spigot end 4 or male end, fixed to a first pipe 6, a bell end 8 or female end, fixed to a second pipe 10, a sealing gasket 12 of resilient material, a locking ring 14, and a plurality of retaining pieces 16.

The spigot end 4 has a cylindrical wall 20 provided at its end with an external chamfer 22 and a locking collar 24 preferably made in the form of an external peripheral weld bead.

The bell end 8 comprises an entrance collar 26 delimiting an opening 30 for the insertion of the spigot end 4, followed, from the rear to the front in the direction from the entrance collar 26 towards the base of the socket, a channel 32 for housing the locking ring 14, an internal projection 34 which axially limits this channel 32, a chamber 36 for receiving the sealing gasket 12, a rib 38 which axially limits this chamber 36, and a cavity 40 for receiving the end of the spigot end 4.

The housing channel 32 comprises a locking surface 42 which is substantially in the form of a truncated cone narrowing towards the entrance of the socket, and an annular base surface 46, which is approximately radial and which is joined to the locking surface 42 by a rounded portion 44.

The internal projection 34 is provided with a receiving recess 48 which opens radially inwards and axially towards the entrance of the socket, and which is adapted to receive the locking collar 24 when the spigot end 4 is positioned in the bell end 8.

The receiving chamber 36, the rib 38, the receiving cavity 40 and the sealing gasket 12 are known elements and will not be described in detail below.

Figure 7:
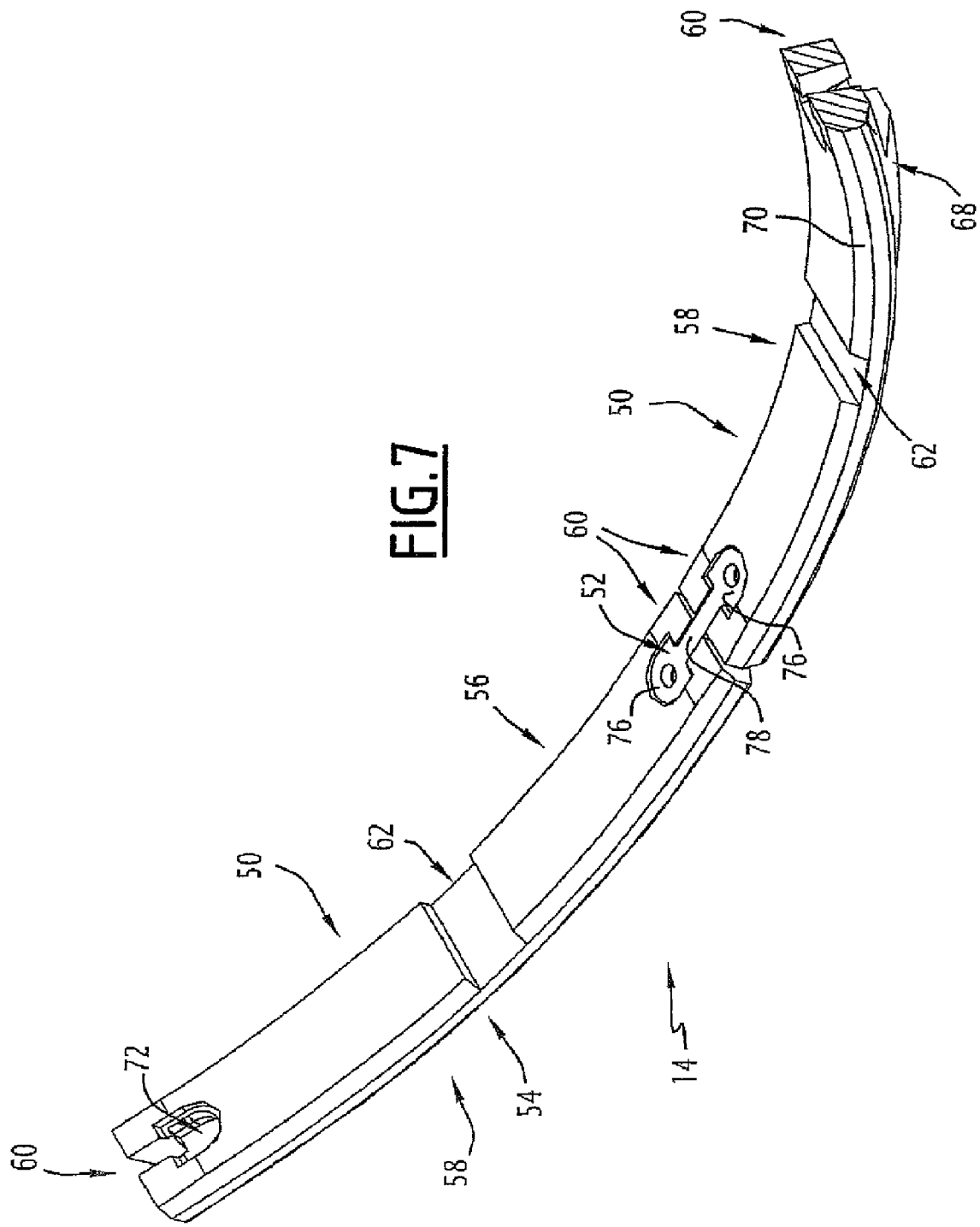
FIG. 7 is a perspective view of two segments of a locking ring according to the invention.

The locking ring 14 comprises a plurality of rigid segments 50, made from metal for example, two of which are shown in FIG. 7. These segments are interconnected by flexible connecting elements 52, so as to form a resiliently deformable continuous ring.

The ring 14 comprises a radially thin axial side 54 and a radially thick axial side 56, the thin side 54 facing the entrance of the socket in the assembled state (see FIG. 2).

Each segment 50 has a main part 58 and two circumferential ends 60.

Each segment 50 also contains a single receiving recess 62 intended to interact with a retaining piece 16.

Each receiving recess 62 is axially open on the thin side 54 and on the thick side 56, in such a way that the recess 62 extends along the whole axial length of the segment 50. The recesses 62 are also radially open towards the inside.

Each segment 50 also comprises a radially outer surface 68 substantially in the shape of a segment of a truncated cone narrowing towards the thin side 54, together with an inner chamfer 70, flaring axially outwards, on the thin side 54.

A receiving slot 72 passes radially through each of the circumferential ends 60 of each segment 50, and is circumferentially open towards the corresponding end 60 of the adjacent segment.

The connecting element 52 is made from resilient material, rubber for example, and comprises two axially widened heads 76 connected by a thin distance piece 78. Each of the widened heads 76 extends into a receiving slot 72, of complementary shape, in two adjacent segments 50, so that each element 52 connects two adjacent segments 50.

The receiving recess 62 is preferably circumferentially centred with respect to the two ends 60 of the segment.

Figure 6:
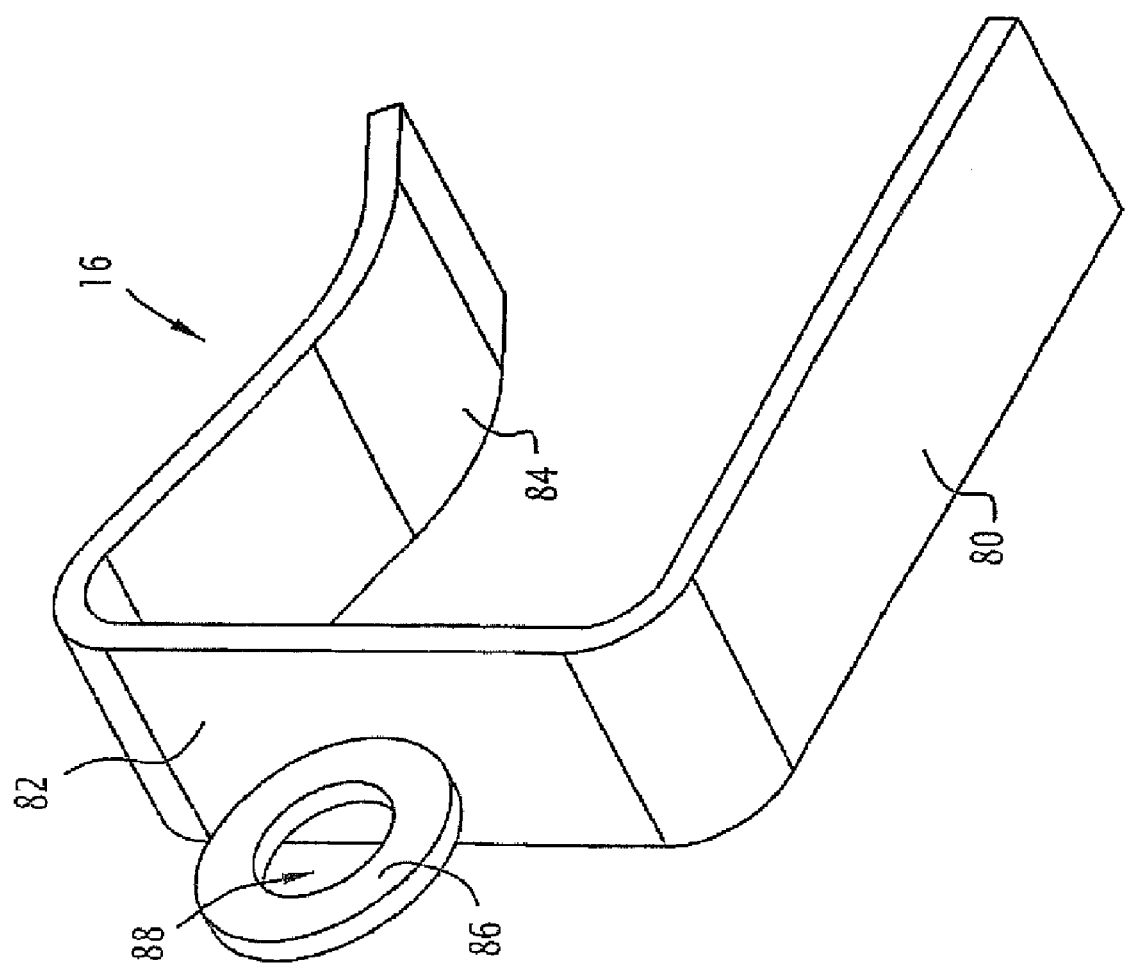
FIG. 6 is a perspective view of a retaining piece according to the invention.

As shown in FIG. 6, the retaining piece 16 is substantially C-shaped and comprises a straight inner branch 80, a web 82 and a curved outer branch 84. Each retaining piece 16 also comprises a handgrip 86, fixed to the web 82 and provided with an aperture 88. The pieces 16 are made from a rigid material and preferably from metal.

As shown in FIG. 2, the retaining pieces 16 are fixed to the entrance collar 26 of the socket and are adapted to hold the locking ring 14 in a pre-expanded position in which its inside diameter is large enough not to obstruct the insertion of the spigot end 4.

The inner branch 80 has an axial length which is sufficient for it to extend along the whole axial length of the recess 62.

The assembly according to the invention is created in the following way.

Figure 1:
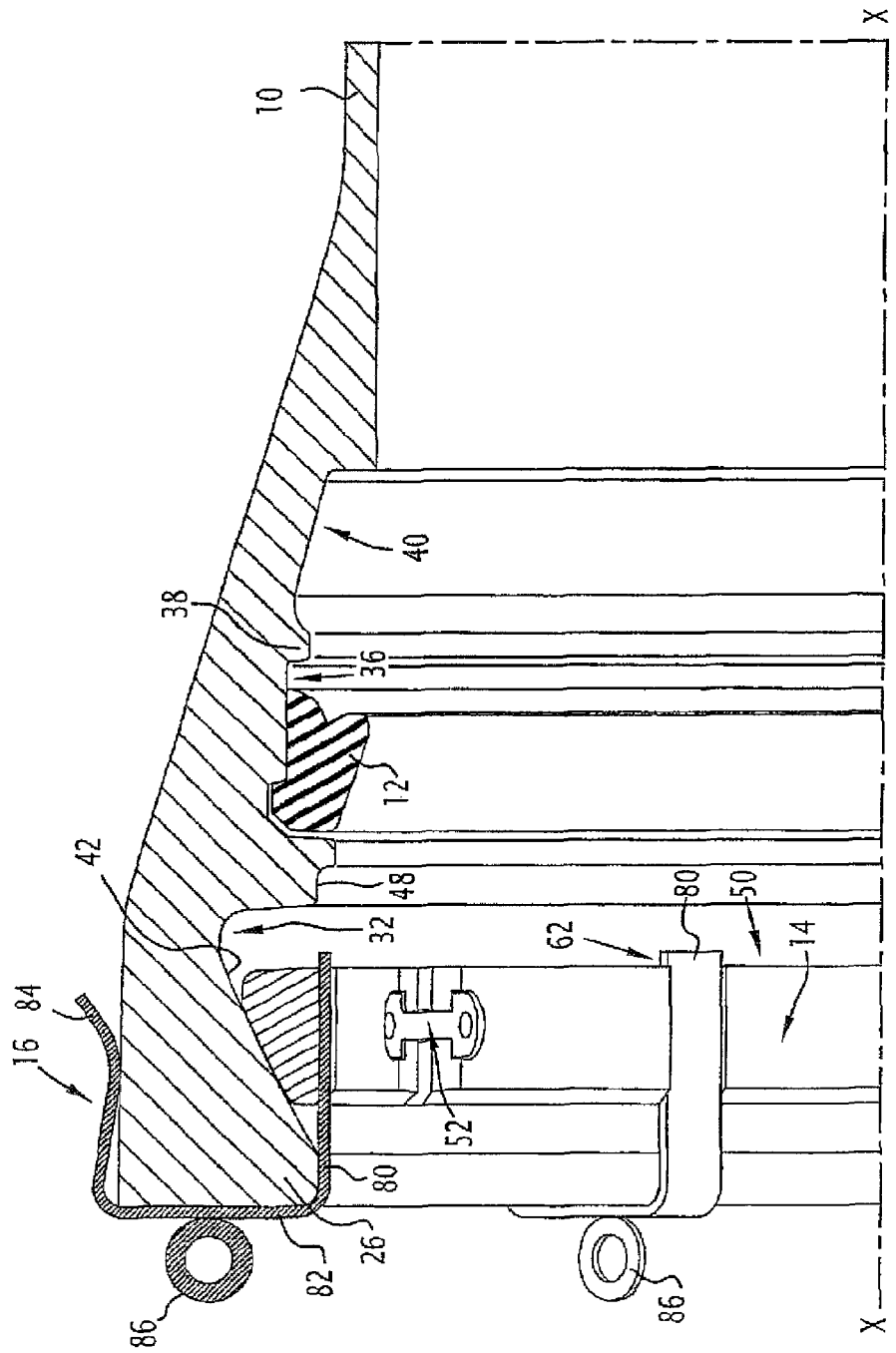
FIGS. 1 to 5 are partial median sectional views of a pipe assembly according to the invention, in different steps of assembly.

Initially, as shown in FIG. 1, the locking ring 14 is located in the channel 32. The ring 14 is held by the pieces 16 and cannot be displaced radially inwards, the pieces also bearing with their curved branches 84 on the outer surface of the entrance collar of the socket and with their webs 82 on the front face of this collar. In this configuration, the pieces 16 pre-expand the locking ring 14 by pre-tensioning the resilient connecting elements 52, and thus position the ring 14 optimally in the channel 32 for the insertion of the spigot end 4. Thus the pieces 16 enable the ring 14 to be held in place in the channel 32, preventing it, in particular, from collapsing, which would impede the insertion of the spigot end 4.

The spigot end 4 can then be inserted into the opening 30 (see FIG. 2).

Figure 3:
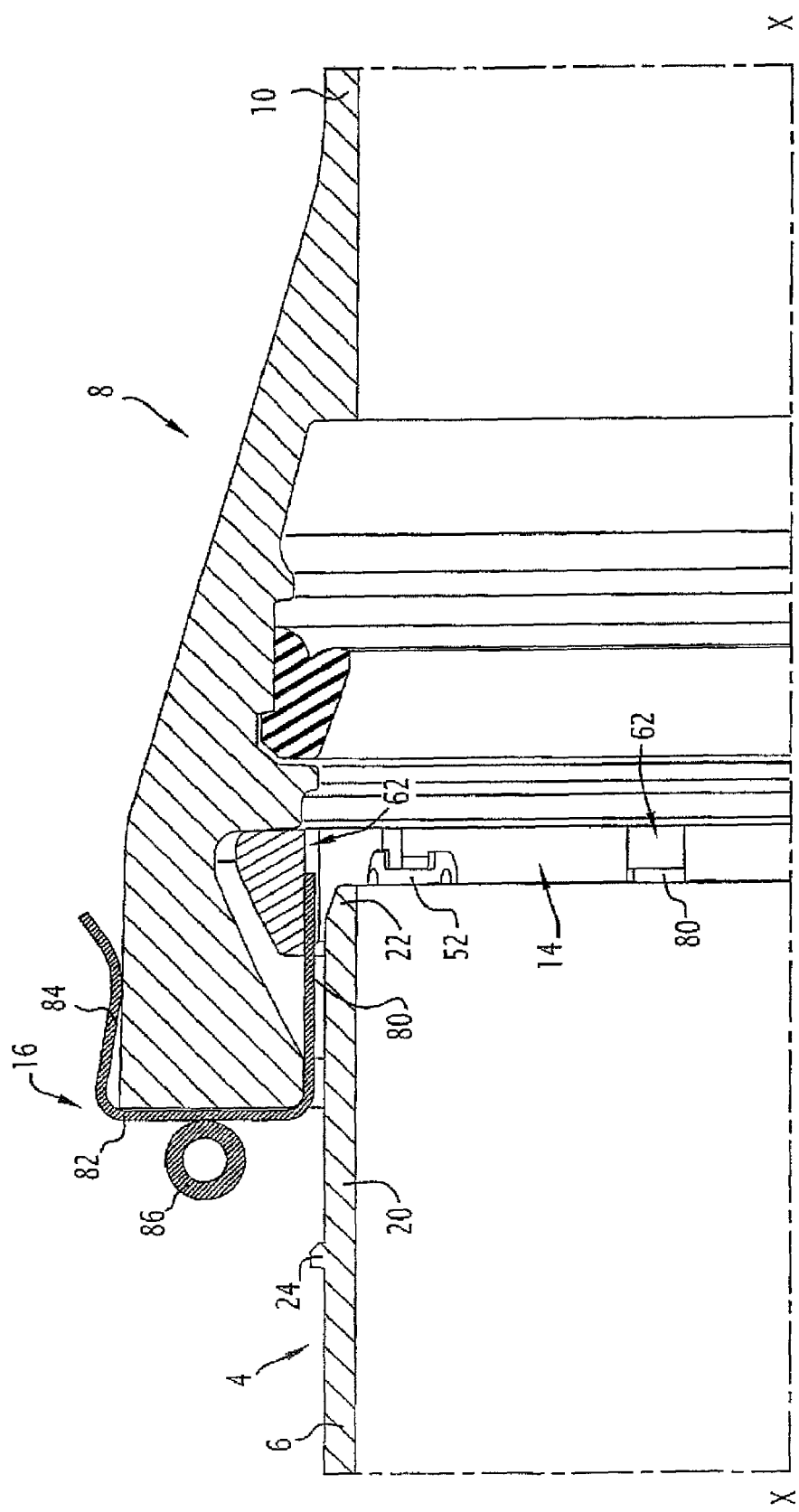

As the insertion continues, the chamfer 22 of the spigot end 4 bears against the chamfer 70 of the segments 50, thus opening the locking ring 14 radially while pushing it axially forwards against the base surface 46 of the channel 32, as shown in FIG. 3. The inner branch 80 of each piece is long enough to extend at least partially into the recess 62 in this configuration.

The pieces 16 are then withdrawn axially from the bell end 8 and the segments 50 then bear resiliently on the cylindrical wall 20 of the spigot end 4 under the force of the flexible connecting elements 52.

Advantageously, the apertures 88 of the handgrips 86 can receive a circumferential cable (not shown) connecting at least two handgrips 86 and enabling the pieces 16 of these handgrips 86 to be pulled out in a single operation, instead of withdrawing them separately.

Figure 4:
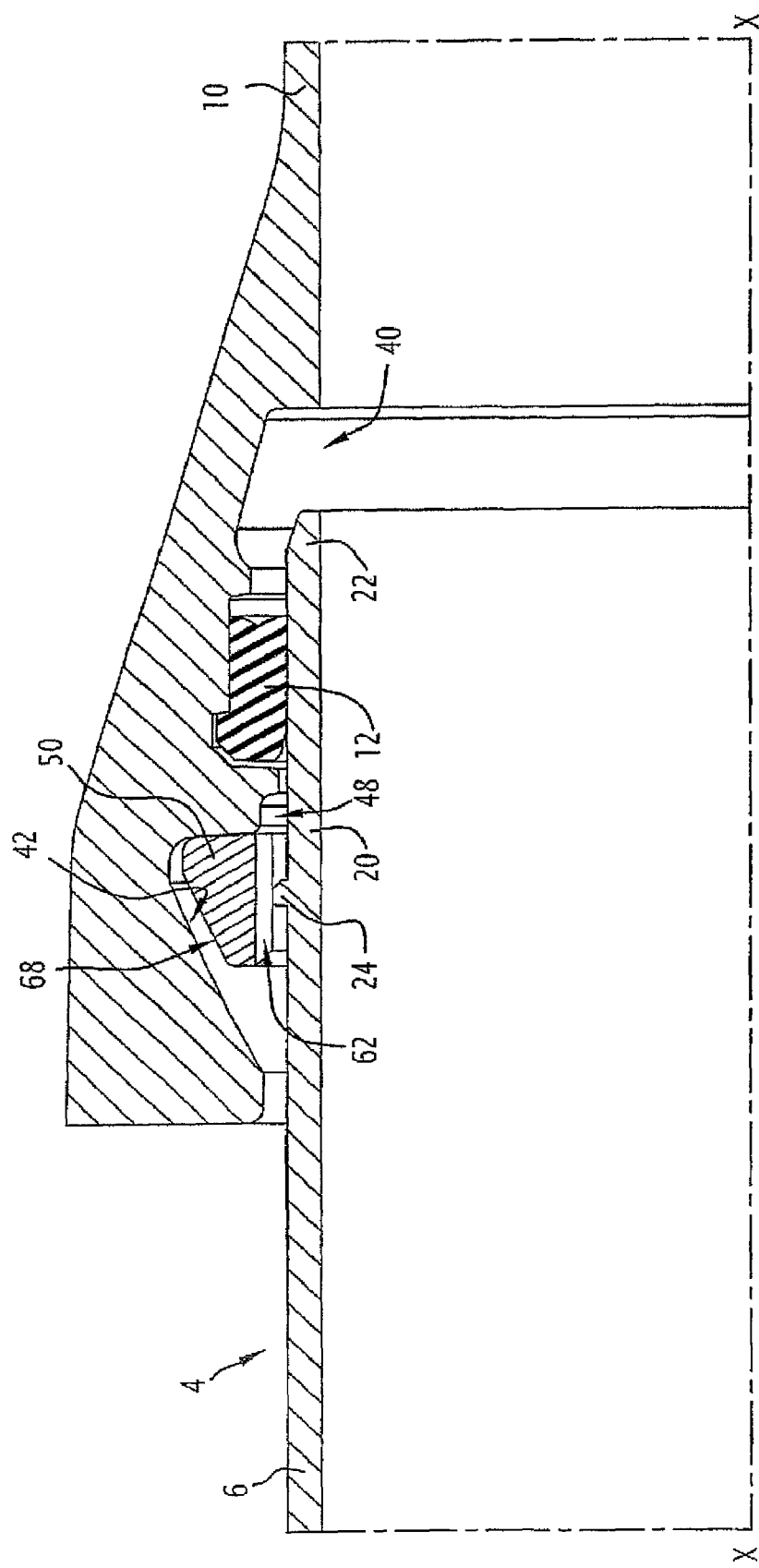

The insertion of the spigot end 4 is then continued until the locking collar 24 bears against the chamfer 70 and spreads the segments 50 radially (see FIG. 4).

When the locking collar 24 is located in the recess 48 of the internal projection 34, the segments 50 are radially tightened again under the force of the connecting elements 52, and the locking ring is then positioned behind the locking collar 24.

Figure 5:
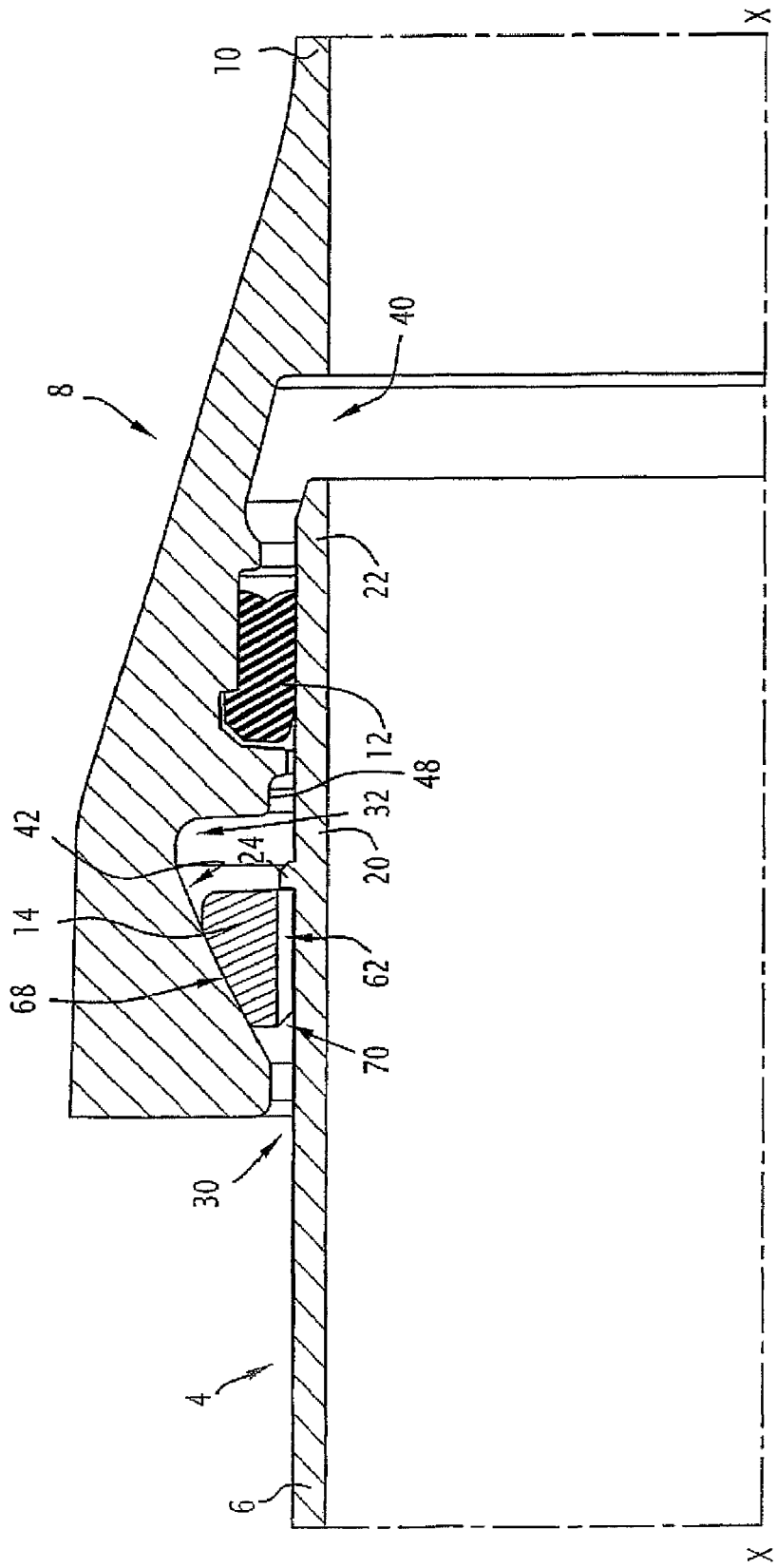

Finally, the spigot end 4 is moved outwards again through a small distance, thus displacing the locking ring 14 axially until it reaches the locking position shown in FIG. 5. In this position, the locking collar 24 bears against the locking ring 14 and the truncated conical surface 68 of the ring 14 bears against the locking surface 42 of the channel 32, thus preventing the separation of the spigot end 4 from the bell end 8.

Figure 8:
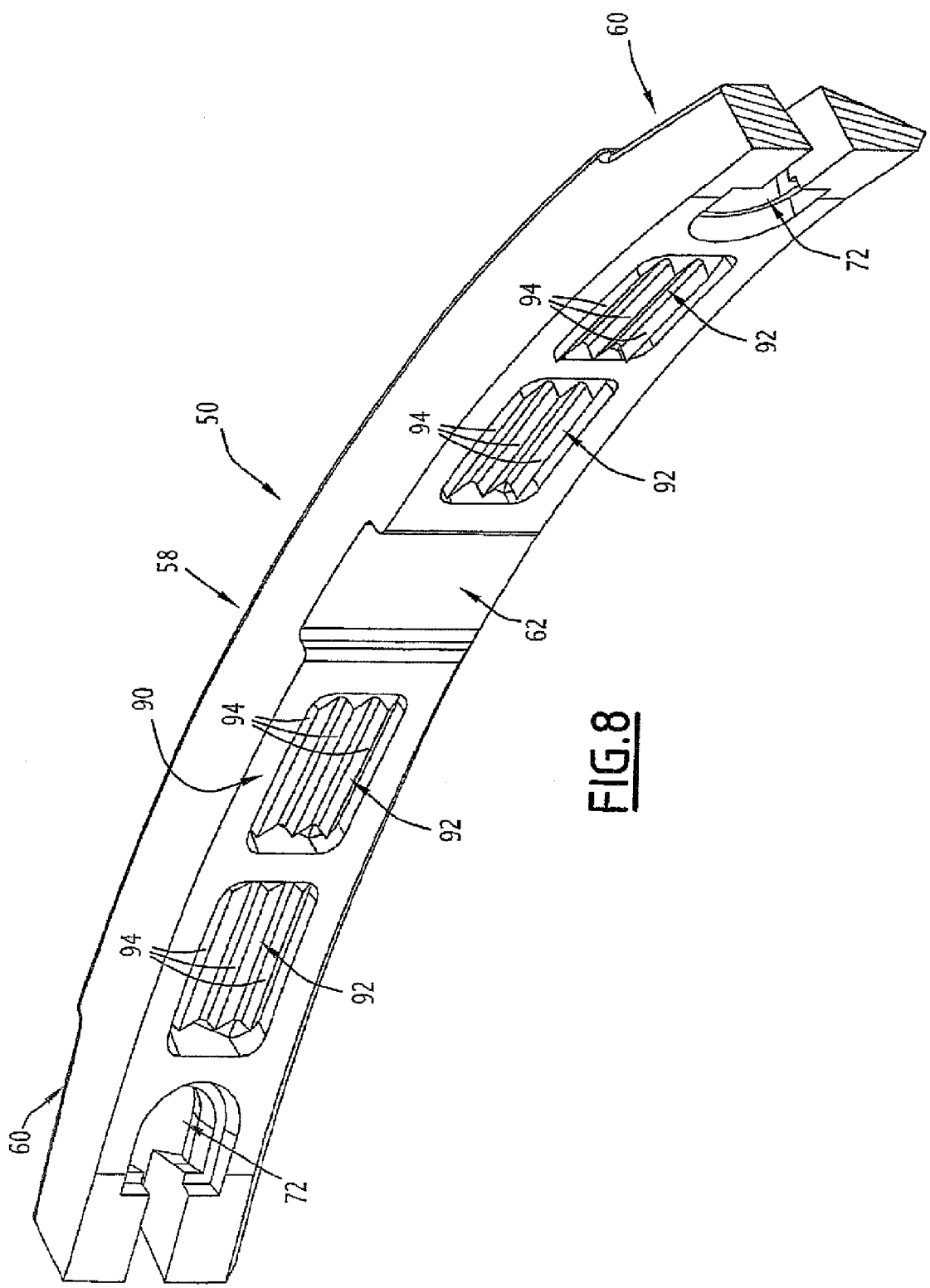
FIG. 8 is a perspective view of a segment of a locking ring in a variant of the invention.

FIG. 8 shows a variant of a segment 50.

In the following text, only the differences from the previously described segments 50 will be disclosed. Similar members carry the same references.

This segment 50 has, on a radially inner surface 90, locking inserts 92, made from a hard material such as hardened metal or ceramic. These inserts 92 have teeth 94 which project radially from the surface 90 and which are adapted to bear against the outer surface of the wall 20 of the spigot end 4.

A locking ring 14 which is provided with such a segment 50 is advantageously adapted to lock a spigot end 4 which is not provided with a locking collar 24.

Another advantage is that the inner surface 90 acts to limit the penetration of the teeth 94 into the spigot end 4 and provides a large bearing surface by comparison with known inserts.

The inserts 92 can be fixed to the rest of the segment 50 by bonding, screwing, or any other means, in the housings provided for this purpose. In a variant, the teeth 94 are made from the same material as the rest of the segment 50.

This ring is then assembled in the following way. The ring is initially pre-expanded by the pieces 16, is then spread by the passage of the spigot end 4, by the stretching of the resilient elements, and is then pressed on to the spigot end when the pieces are withdrawn.

The locking ring according to the invention is particularly suitable for locking pipes of large diameter, for example pipes having a nominal diameter of more than 500 mm. For example, a ring for a pipe having a nominal diameter of 1200 mm has ten segments 50.

The chamfer 70 of the segmented ring 14, positioned on its part facing the entrance of the socket, facilitates the passage of the spigot end 4 and the opening of the ring.

The recesses 62 advantageously enable the pieces 16 to be housed under the ring. These recesses 62 also make it possible to have retaining pieces with a straight branch which can be re-used from one assembly to another.

The invention claimed is:

1. A locking ring which is adapted to lock a joint between two tubular elements (4, 8), which extends around a central axis (X-X), and which comprises at least two rigid segments (50) which each have a main part (58) and two circumferential ends (60), each segment (50) having a shape which flares out from a thin axial side to a thick axial side (56), characterized in that at least one of the segments (50) comprises at least one recess (62) for receiving a retaining member (16), in that the receiving recess (62) is axially open on the thin axial side, in that the receiving recess (62) extends solely through the main part (58), and in that the receiving recess (62) is circumferentially limited on both sides, and further characterized in that the ring comprises resilient connecting elements (52), each connecting the two ends (60) of two adjacent segments (50).

2. The ring according to claim 1, characterized in that each segment (50) which is connected to another segment by a connecting element (52) comprises housings (72) for the connecting elements (52), these housings (72) being open circumferentially and radially towards the inside.

3. A pipe assembly comprising:

a bell end (8) provided with a channel (32) for housing a locking ring (14), and a locking ring (14) adapted to lock a spigot end (4) in the bell end (8), characterized in that the locking ring is a ring (14) which is adapted to lock a joint between two tubular elements (4, 8), which extends around a central axis (X-X), and which comprises at least two rigid segments (50) which each have a main part (58) and two circumferential ends (60), each segment (50)having a shape which flares out from a thin axial side to a thick axial side (56), characterized in that at least one of the segments (50) comprises at least one recess (62) for receiving a retaining member (16), in that the receiving recess (62) is axially open on the thin axial side, in that the receiving recess (62) extends solely through the main part (58), and in that the receiving recess (62) is circumferentially limited on both sides thereof by a wall of the segment;

and in that the assembly comprises at least one member (16) for retaining a segment (50) on the bell end (8) in opposition to a radially inward displacement, the retaining member (16) being fastened to the bell end (8) and extending into the receiving recess (62).

4. The pipe assembly according to claim 3, characterized in that the receiving recess (62) is radially open towards the interior of the central axis (X-X).

5. The pipe assembly according to claim 3, characterized in that the receiving recess (62) extends through the whole axial length of the segment (50) in such a way that it is axially open on both sides.

6. The pipe assembly according to claim 3, characterized in that the receiving recess (62) is circumferentially centered with respect to the two circumferential ends (60) of the segment (50).

7. The pipe assembly according to claim 6, wherein the segment has only one single receiving recess (62).

8. The pipe assembly according to claim 3, characterized in that the ring comprises, on the thin side, a radially internal chamfer (70) flaring axially towards the outside.

9. The pipe assembly according to claim 3, characterized in that the retaining member (16) comprises a branch (80) extending into the receiving recess (62) through the whole axial length of the recess.

10. The pipe assembly according to claim 3, characterized in that the assembly also comprises a spigot end (4) inserted into the bell end (8), the spigot end (4) being locked in the bell end (8) by means of the locking ring (14).

11. A method for creating an assembly according to claim 10, characterized by the following successive steps:

a) insertion of the locking ring (14) into the channel (32) of the bell end (8) and pre-expansion of the locking ring (14) by means of the retaining member or members (16);

b) fitting of the spigot end (4) into the bell end (8) and radial spreading of the locking ring (14) during the passage of the spigot end;

c) withdrawal of the retaining member or members (16), causing the locking ring (14) to be tightened again around the spigot end; and d) withdrawal of the spigot end (4) until the spigot end reaches the locked position, in which the ring (14) bears against a locking surface (42) of the bell end (8).

12. The method according to claim 11, further characterized by the following step between steps c) and (d): continuation of the fitting of the spigot end (4), when this end has a locking collar (24), until this collar (24) passes through the locking ring (14).

* * * * *